United States Patent [19]

McDuffie et al.

[11] 4,327,544
[45] May 4, 1982

[54] VARIABLE SPEED INDICATOR FOR COMBINE

[75] Inventors: James W. McDuffie; Larimer J. Knepper, both of New Holland, Pa.

[73] Assignee: Sperry Corporation, New Holland, Pa.

[21] Appl. No.: 260,949

[22] Filed: May 6, 1981

[51] Int. Cl.³ .................... A01D 41/06; A01D 69/00
[52] U.S. Cl. ...................................... 56/10.2; 56/11.1
[58] Field of Search ............... 56/10.2, DIG. 15, 208, 56/11.1, 13.5

[56] References Cited

U.S. PATENT DOCUMENTS

| 2,611,227 | 9/1952 | Keller | 56/DIG. 15 |
| 3,349,747 | 10/1967 | Vande Wiele | 56/208 |
| 3,540,028 | 11/1970 | Love | 56/208 |
| 3,908,345 | 9/1975 | Oni et al. | 56/208 |
| 3,967,437 | 7/1976 | Mott et al. | 56/208 |

FOREIGN PATENT DOCUMENTS

| 1213661 | 3/1966 | Fed. Rep. of Germany .... 56/DIG. 15 |
| 1422691 | 12/1965 | France ................................. 56/208 |

Primary Examiner—Paul J. Hirsch
Attorney, Agent, or Firm—C. Hercus Just; Frank A. Seemar; Larry W. Miller

[57] ABSTRACT

A combine having a header on the forward end of it which operates to cut and deliver crop material to an elevator in a feeder house over which a cab is provided at an elevated location. The elevator delivers the material to the threshing mechanism of the combine. The engine of the combine is connected by a belt drive to a vari-drive supported by the feeder house and a yoke on the vari-drive moves one flange of the adjustable sheave of the vari-drive relative to the other. An auxiliary motor actuates the yoke by driving a rotatable screw and a Bowden cable is connected between a pivoted speed-indicating needle on a dial mounted in view of the cab and the follower of the yoke which is actuated by the screw which is operated to move the yoke to change the adjustable sheave and vary the speed of operation of the combine.

5 Claims, 4 Drawing Figures

VARIABLE SPEED INDICATOR FOR COMBINE

BACKGROUND OF THE INVENTION

In recent years, combines have become very large in size, especially for purposes of rendering the same capable of harvesting very wide swaths of crop material, thresh the same, and contain the threshed material in suitable storage compartments included in the combine. Enlargement of the size of the combines also has resulted in the operator being positioned in a cab or platform elevated a substantial distance upon the harvesting portion of the combine supported at the forward end thereof. In a number of combines of this type, the cab or seating platform is mounted above a feeder box in which an elevator is operable to move the material cut by the header at the forward end of the combine to the threshing mechanism rearwardly of the feeder box. In many situations, the operator actually is located several feet above the level of the ground and a number of feet above the mechanism below the cab or platform.

It also is often desirable for the operator to know the relative speed at which the combine is operating, especially for purposes adjusting the speed in accordance with the thickness or density of the crop being harvested and thereby not place a burden upon the operating mechanism of the combine, especially the engine thereof, which generally is a diesel engine. Heretofore, however, there has not been any simple but effective means for visually indicating to the operator of the combine the general speed at which it is functioning. It is old, of course, to employ tachometers associated with engines, especially automobile engines, to indicate the speed of the engine. Therefore, engine speed-indicating means is not practical for a combine, particularly where the principal engine of the combine operates a vari-drive on the forward part of the combine which distributes power, particularly to the cutting means of the header, the elevator of the feeder house and other related operating mechanism associated therewith.

According to the prior art, it is old, for example, to provide visible indicating means, of a relatively simple nature, to permit an operator to observe the amount of the float of a header connected to a combine, but in no way indicating the speed of operation of the combine attachment. Such a device is illustrated in prior U.S. Pat. No. 3,349,747, dated Oct. 31, 1967, to Vande Wiele. Similarly, prior U.S. Pat. No. 3,967,437, to Mott et al, dated July 6, 1976, shows a relatively simple indicating means visible to the operator of the combine and functioning to indicate the position of the uppermost area of the cutter bar in the header of a combine. Again, however, no indicating means are disclosed for purposes of revealing to a combine operator, the speed of the operation of the combine attachment.

It is the principal purpose of the present invention to provide a very simple speed-indicating means to visually indicate readily to the operator of the attachment, the speed of operation of the functioning mechanisms of the combine attachment, details of which are set forth below.

SUMMARY OF THE INVENTION

It is among the principal objects of the present invention to provide on a combine of the large modern type, in association with a header and feeder house, supported by the forward end of the combine, simple and readily positioned indicating means to disclose at a glance to the operator of the combine in a cab thereon, the speed of operation of the mechanism constituting the header and contained within the feeder house, the speed-indicating means being directly operated by the vari-drive supported at one side of the feeder house for convenience of mounting and operation. It is another object of the invention to support the movable flange of the vari-drive by a yoke pivoted at one end upon a bracket supported by one side of the feeder house and the opposite end of the yoke being operable by a follower connected to said opposite end of the yoke and mounted upon a screw driven by an auxiliary motor of reversible type, such as a hydraulic or an electric motor for example, in opposite directions, to move said one flange of the vari-drive sheave relative to the opposite flange and thereby, vary the radius of the drive belt extending around the vari-drive sheave and correspondingly, vary the speed of operation of the elevator in the feeder house and cutting means and other mechanism in the header, the speed-indicating means referred to above being directly responsive to the position of the follower on said screw in view of a Bowden cable connection between said follower and a movable pointer finger on the indicating means.

A still further object of the invention is to provide a simple bracket upon the feeder house or inner, upper end portion of the header upon which a fixed plate having suitable indicia is mounted and in relation to which the aforementioned pointer moves, said bracket and indicating mechanism being forward of and below the cab of the combine and located so as to be readily visible to an operator located in said cab during operation of the combine.

Still another object of the invention ancillary to the immediate foregoing object is to support the flexible sheath of the Bowden cable along one side of the feeder house and anchor the ends thereof respectively on fixed brackets supported by the feeder house, while opposite ends of the flexible wire of the Bowden cable respectively are fixed to the movable pointer of the indicating means and the follower of the screw which actuates the yoke of the vari-drive.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figure 1:
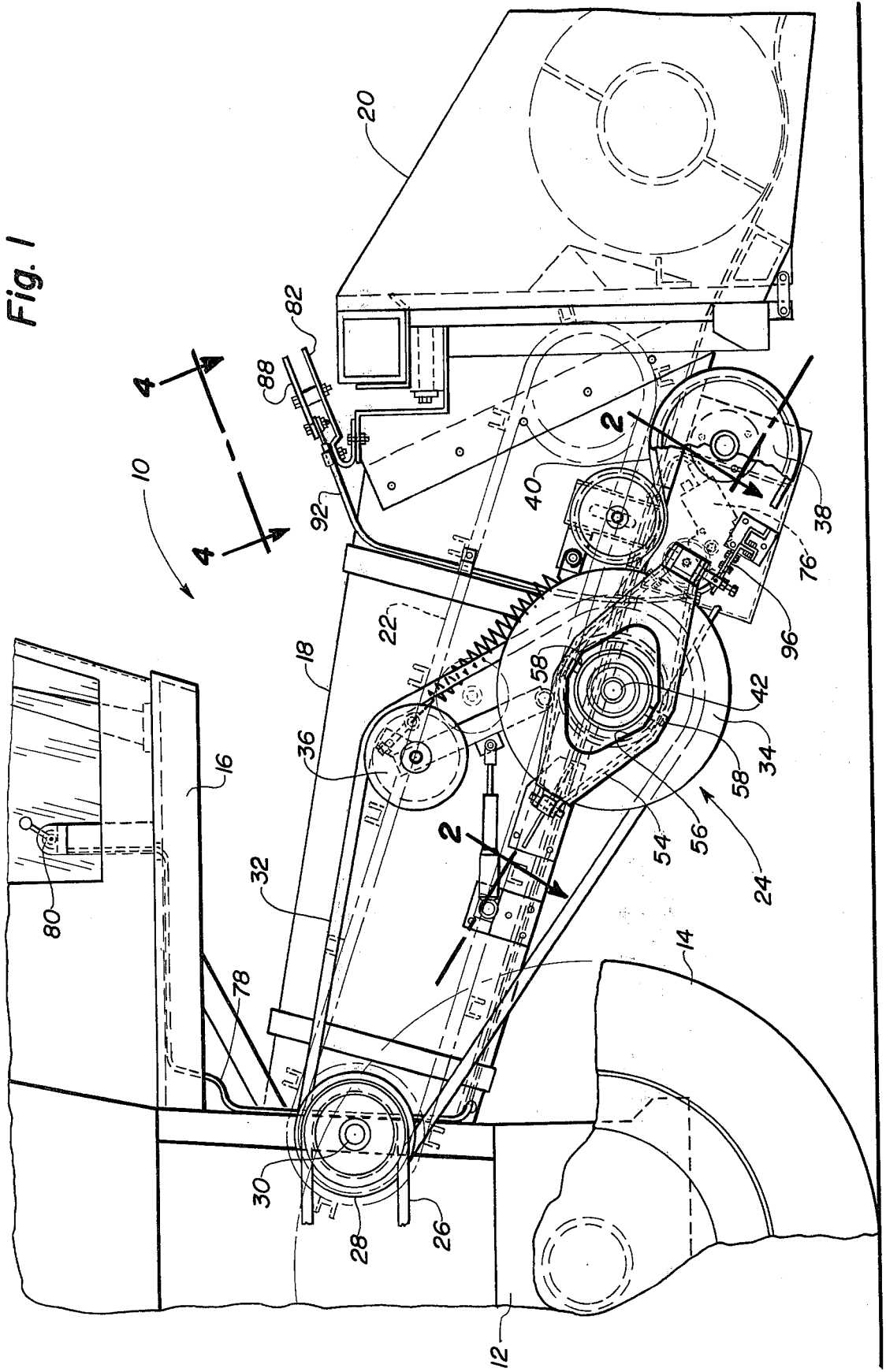
FIG. 1 is a fragmentary side elevation of the forward portion of a conventional combine of the type to which the present invention pertains and also illustrating details of the vari-drive unit in the manner in which speed-indicating means is associated therewith and actuated thereby.

Referring to FIG. 1, the essential parts of a relatively large combine to which the present invention pertains is illustrated therein, some of it being in fragmentary form, such as a mobile frame 12, which is supported by a plurality of wheels, one of the drive wheels 14 being shown fragmentarily. On the upper portion of frame 12 is a cab 16, also illustrated fragmentarily and extending over and vertically above a feeder house 18, which is pivotally connected at its rearward end to the forward portion of frame 12. A fragmentarily-shown portion of a header 20 is connected to the forward end of the feeder house 18 and is adapted to be disposed adjacent the ground surface for purposes of the cutter means therein, not shown, severing the crop material and delivering the same to an elevator 22, shown in phantom in FIG. 1.

Mounted upon one sidewall of the feeder house 18 is a vari-drive unit 24, which is actuated by the main engine or prime mover, not shown, in the combine and supported by the frame 12. Said engine drives a belt 26 extending around one sheave which drives a second sheave 28, mounted on shaft 30, said second sheave 28 having endless belt means 32 extending therearound, and also extending around the adjustable sheave unit 34 of the vari-drive unit 24 and also extending around a tightening roller 36. The vari-drive 24, by means of another sheave 38, and belt means 40 extending therearound, which belt also extends around the adjustable sheave unit 34, drives the elevator 22, the cutting means, not shown, in header 20, and other mechanism either in the feeder house 18 or header 20, which normally is included in a combine of the type to which the present invention pertains.

Figure 2:
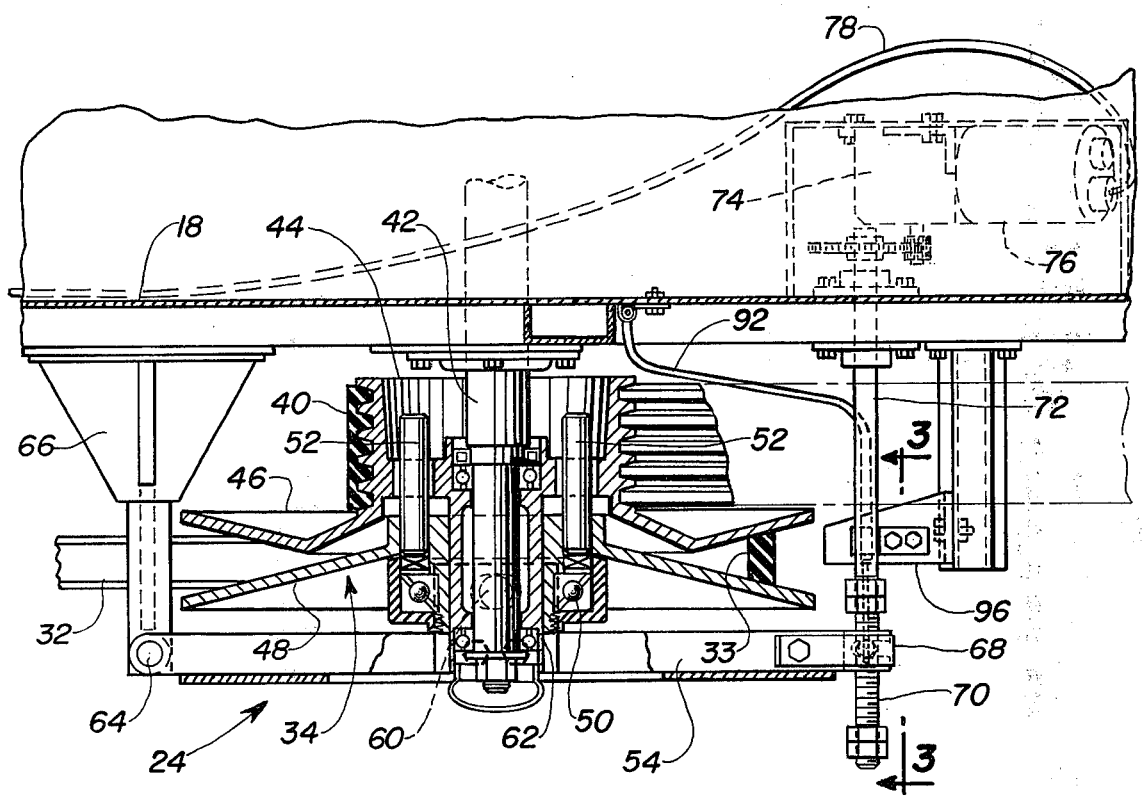
FIG. 2 is a fragmentary transverse sectional view of certain details of the mechanism shown in FIG. 1, as seen on the line 2—2 thereof.

Referring to FIG. 2, wherein the vari-drive unit 24, and especially the adjustable sheave unit 34 is illustrated in transverse section, it will be seen that a shaft 42 supports the hub 44 connected to a first flange 46 of adjustable sheave unit 34, said flange 46 being axially stable, but it is rotated to drive belt means 40 and sheave 38. The adjustable sheave unit 34 also includes an axially-movable second flange 48, said flange having a bearing 50 mounted upon shaft 42, and guide pins 52, extending axially and carried by second flange 48 extend through complementary openings in a web of hub 44 of the first flange 46 for purposes of insuring unitary rotation of both flanges of the adjustable sheave unit 34.

The adjustable sheave unit 34 is driven by belt 32 in a manner to effect variable speed of the sheave unit 34 and, correspondingly, the belt means 40 and the mechanism driven thereby, as described above. The endless belt means 32 is shown both longitudinally in FIG. 2, and also in cross-section at 33. As the flanges 46 and 48 separate greater distances, the diameter of the portion of the belt 32 within said sheave means decreases and the speed of the output belt 40 increases, and vice versa. To effect the axial movement of the second flange 48 relative to first flange 46, flange 48 is connected to a yoke 54, which has a central opening 56, on the opposite sides of which are opposite branches 58 respectively supporting pintles 60, shown in phantom in FIG. 2, in engagement with the hub 62 of the second, axially movable flange 48 for purposes of controlling the position thereof with respect to the axially stable flange 46.

One end of the yoke 54 is pivoted at 64 to a fixed bracket 66 on one side of the feeder house 18 and the opposite end of yoke 54 supports a female threaded follower 68, through which a rotatable screw 70 extends, as a continuation of shaft 72, extending from a gear box 74, shown in phantom in FIG. 2, driven by the motor 76, shown as being electrically powered.

The electric motor 76 is of the reversible type, and is energized by a conduit 78, which extends to a source of current, not shown, of conventional type on the combine 10, said conduit comprising part of a circuit which also includes a reversible switch 80 supported in the cab 16, as shown in FIG. 1, for purposes of determining the direction in which the motor 76 shall run and, correspondingly, the direction in which the follower 68 on yoke 54 will move to cause wider or closer spacing of the flanges 46 and 48 of the adjustable sheave unit 34, and thereby control the speed of operation of the essential mechanism in the feeder house 18 and header 20.

Figure 3:
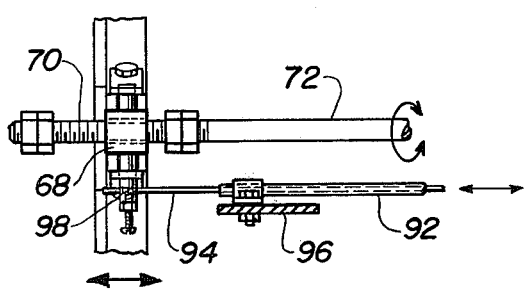
FIG. 3 is a fragmentary vertical sectional view of the screw and follower mechanism for controlling the vari-drive structure shown in FIG. 2, as seen on the line 3—3 thereof.
Figure 4:
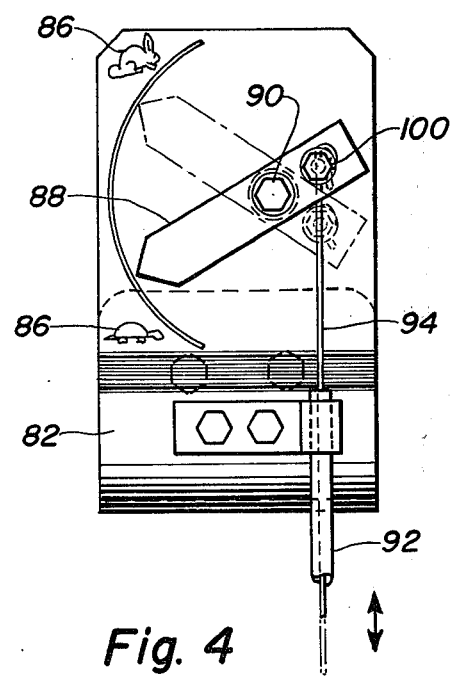
FIG. 4 is a substantially horizontal fragmentary view, on a larger scale than FIG. 1, and illustrating the details of speed-indicating means shown in FIG. 1, as seen on the line 4—4 thereof.

The principal aspect of the present invention comprises a relatively simple means to indicate the speed at which the drive belt 32 is operating the sheave unit 34 for purposes of driving sheave 38 in the various mechanisms actuated thereby in feeder house 18 and header 20. The means selected to accomplish this in accordance with the present invention are best illustrated in the various figures and include a bracket 82 fixedly mounted upon the forward end of feeder house 18, for example, said bracket having a leaf 84, which serves as a display for indicia 86 symbolizing fast speed and slow speed, an indicating finger 88 being pivotally supported upon the leaf 84 by a pivot bolt 90 disposed intermediately of the ends of the finger 88. A Bowden cable 92, which comprises a sheath of flexible nature surrounding a wire 94, extends between the bracket 82 and extension 96 on the lower part of the feeder house 18, as best shown in FIG. 1, said bracket also being shown in FIG. 3 fragmentarily. The follower 68, as seen in FIG. 3, has a projecting clamp 98 to which one end of the wire 94 of the Bowden cable is clamped for movement of the wire by the follower with respect to the sheath, the opposite end of the wire 94 being connected to the end of the indicating finger 88, which is opposite the indicating end, by means of a swivel bolt 100.

It will be seen from the foregoing that the combine operator, by means of switch 80, effects increase or decrease of the speed at which the header and contents of the feeder house are operated. To indicate visually while operating within the cab 16, the relative speed of such operation of the combine, it readily can be appreciated from FIG. 1 that all the operator has to do is observe the indicating finger 88 relative to the indicia 86 to approximate the speed of such operation to his satisfaction. It also will be seen that such feed indicating means is relatively simple, stable, and very logically is directly associated with the operating means for the vari-drive unit 24, which directly controls such speed.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A combine having a header on the forward end thereof, a feeder house rearwardly of the header to receive cut crop material and elevate it to the inlet of the threshing chamber of the combine, a cab mounted above said feeder house, a vari-drive sheave supported by said feeder house at one side thereof, an engine mounted upon said combine, drive transfer means between said engine and vari-drive sheave, an auxiliary motor, a yoke pivoted at one end relative to said feeder house, means connecting said yoke to one of the flange members of said vari-drive to move the same toward and from the other flange member to vary the drive speed provided by said vari-drive to movable members on said combine, and adjusting means operated by said auxiliary motor and connected to the other end of said yoke to move the same and effect movement of said one of said flange members as aforesaid, in combination with speed-indicating means comprising a bracket carried by said feeder house in viewing position from said cab, speed-indicating indicia on a plate on said bracket, a pointer movable upon said bracket relative to said indicia, and a Bowden cable connected between said pointer and said adjusting means operated by said auxiliary motor to vary the position of said pointer proportionately to the speed of said vari-drive which controls the speed of operation of the combine.

2. The combine according to claim 1 further characterized by said adjusting means which is operated by said auxiliary motor comprising a threaded screw rotated by said motor and operatively engaged with said other end of said yoke, and said other end of said yoke having means to attach one end of the wire of said Bowden cable thereto, and stationary bracket means on said feeder house fixedly securing the corresponding end of the sheath of the Bowden cable fixed relative to the feeder house.

3. The combine according to claim 2 further including a female threaded follower upon said screw, means connecting said follower to said other end of said yoke, and said one end of said wire of said Bowden cable being fixed to said follower and the opposite end of said wire being pivotally connected to said pointer to said speed-indicating means.

4. The combine according to claim 3 in which said auxiliary motor is a reversible electric motor and is operable to cause said screw to operate in reverse directions and thereby shift the movable flange of said vari-drive respectively in speed-increasing or speed-decreasing directions.

5. The combine according to claim 4 in which an electric circuit is supported by said combine from a source of current thereon to said electric motor, and a double throw switch is connected in said circuit and mounted in said cab for convenient access for operation.

* * * * *